(12) United States Patent
Nikam et al.

(10) Patent No.: US 11,507,434 B2
(45) Date of Patent: Nov. 22, 2022

(54) RECOMMENDATION AND DEPLOYMENT ENGINE AND METHOD FOR MACHINE LEARNING BASED PROCESSES IN HYBRID CLOUD ENVIRONMENTS

(71) Applicant: HEWLETT PACKARD ENTERPRISE DEVELOPMENT LP, Houston, TX (US)

(72) Inventors: Sagar Ratnakara Nikam, Bangalore (IN); Mayuri Ravindra Joshi, Bangalore (IN); Raj Narayan Marndi, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 153 days.

(21) Appl. No.: 16/775,201

(22) Filed: Jan. 28, 2020

(65) Prior Publication Data

US 2020/0250012 A1     Aug. 6, 2020

(30) Foreign Application Priority Data

Feb. 1, 2019   (IN) .............................. 201941004131

(51) Int. Cl.
*G06F 9/50* (2006.01)
*G06N 20/00* (2019.01)

(52) U.S. Cl.
CPC ............ *G06F 9/5088* (2013.01); *G06F 9/505* (2013.01); *G06F 9/5072* (2013.01); *G06N 20/00* (2019.01)

(58) Field of Classification Search
CPC ...... G06F 9/5088; G06F 9/5072; G06F 9/505; G06F 9/5027; G06F 2209/5014; G06F 2209/5015; G06N 20/00; G06N 3/08
See application file for complete search history.

(56) References Cited

U.S. PATENT DOCUMENTS 9,813,318 B2    11/2017  Iyoob et al.
2012/0304191 A1*  11/2012  Morgan ............... G06F 9/5088
                                                        718/105

(Continued)

FOREIGN PATENT DOCUMENTS

EP    2569709 A2    3/2013
WO    2011/143568 A2  11/2011
WO    2014/202929 A1  12/2012

OTHER PUBLICATIONS

AWS, "AWS Compliance Programs", available online at <https://web.archive.org/web/20191231161201/https://aws.amazon.com/compliance/programs/>, Dec. 31, 2019, 24 pages.

(Continued)

*Primary Examiner* — Sisley N Kim
(74) *Attorney, Agent, or Firm* — Hewlett Packard Enterprise Patent Department

(57) ABSTRACT

Methods and systems are provided for the deployment of machine learning based processes to public clouds. For example, a method for deploying a machine learning based process may include developing and training the machine learning based process to perform an activity, performing at least one of identifying and receiving an identification of a set of one or more public clouds that comply with a set of regulatory criteria used to regulate the activity, selecting a first public cloud of the set of one or more public clouds that complies with the set of regulatory criteria used to regulate the activity, and deploying the machine learning based process to the first public cloud of the set of one or more public clouds.

17 Claims, 6 Drawing Sheets

(56) References Cited

U.S. PATENT DOCUMENTS

| | | | |
|---|---|---|---|
| 2013/0198050 A1 | 8/2013 | Shroff et al. | |
| 2015/0163288 A1* | 6/2015 | Maes et al. | |
| 2017/0118282 A1* | 4/2017 | Lee | H04L 67/322 |
| 2019/0050862 A1* | 2/2019 | Oka | G06Q 20/24 |
| 2019/0206520 A1* | 7/2019 | Eteminan | G06F 16/278 |
| 2019/0303608 A1* | 10/2019 | Cohen | G06N 3/08 |
| 2020/0004582 A1* | 1/2020 | Fornash | G06F 9/4856 |

OTHER PUBLICATIONS

Google Cloud, "Compliance Resource Center", available online at <https://web.archive.org/web/20200125052407/https://cloud.google.com/security/compliance/>, Jan. 25, 2020, 5 pages.

Kubeflow, "Kubeflow Overview", available online at <https://www.kubeflow.org/docs/started/kubeflow-overview/>, Dec. 13, 2019, 5 pages.

Microsoft Docs, "Microsoft Compliance Offerings", available online at <https://web.archive.org/web/20191225211213/https://docs.microsoft.com/en-us/microsoft-365/compliance/offering-home>, Dec. 25, 2019, 2 pages.

Mike Vizard, "Pipeline AI Leverages Docker to Simplify AI Model Development", available online at <https://containerjournal.com/topics/container-ecosystems/pipelineai-leverages-docker-to-simplify-ai-model-development/>, AI, artificial intelligence, docker, open source, PipelineAI, Jul. 16, 2018, 4 pages.

Wagle et al., "Cloud Service Optimization Method for Multi-cloud Brokering", IEEE International Conference on Cloud Computing in Emerging Markets (CCEM), 2015.

Wikipedia, "TensorFlow", available online at <https://en.wikipedia.org/w/index.php?title=TensorFlow&oldid=937693618>, Jan. 26, 2020, 7 pages.

* cited by examiner

RECOMMENDATION AND DEPLOYMENT ENGINE AND METHOD FOR MACHINE LEARNING BASED PROCESSES IN HYBRID CLOUD ENVIRONMENTS

BACKGROUND

Machine learning is an emerging technology used to automate the construction and evolution of analytic models. More precisely, it is a branch of artificial intelligence based on the idea that machines can "learn" from data in order to identify patterns and make decisions with minimal human direction. Machine learning provides for a wide range of automated tasks and spans multiple diverse industries, such as providing data security, providing fraud detection, aiding in medical diagnoses, and even developing personal digital assistants that do everything from providing travel directions to recommending music for individual users.

BRIEF DESCRIPTION OF THE DRAWINGS

Various examples of this disclosure that are proposed as examples will be described in detail with reference to the following figures, wherein like numerals reference like elements, and wherein.

DETAILED DESCRIPTION

Figure 1:
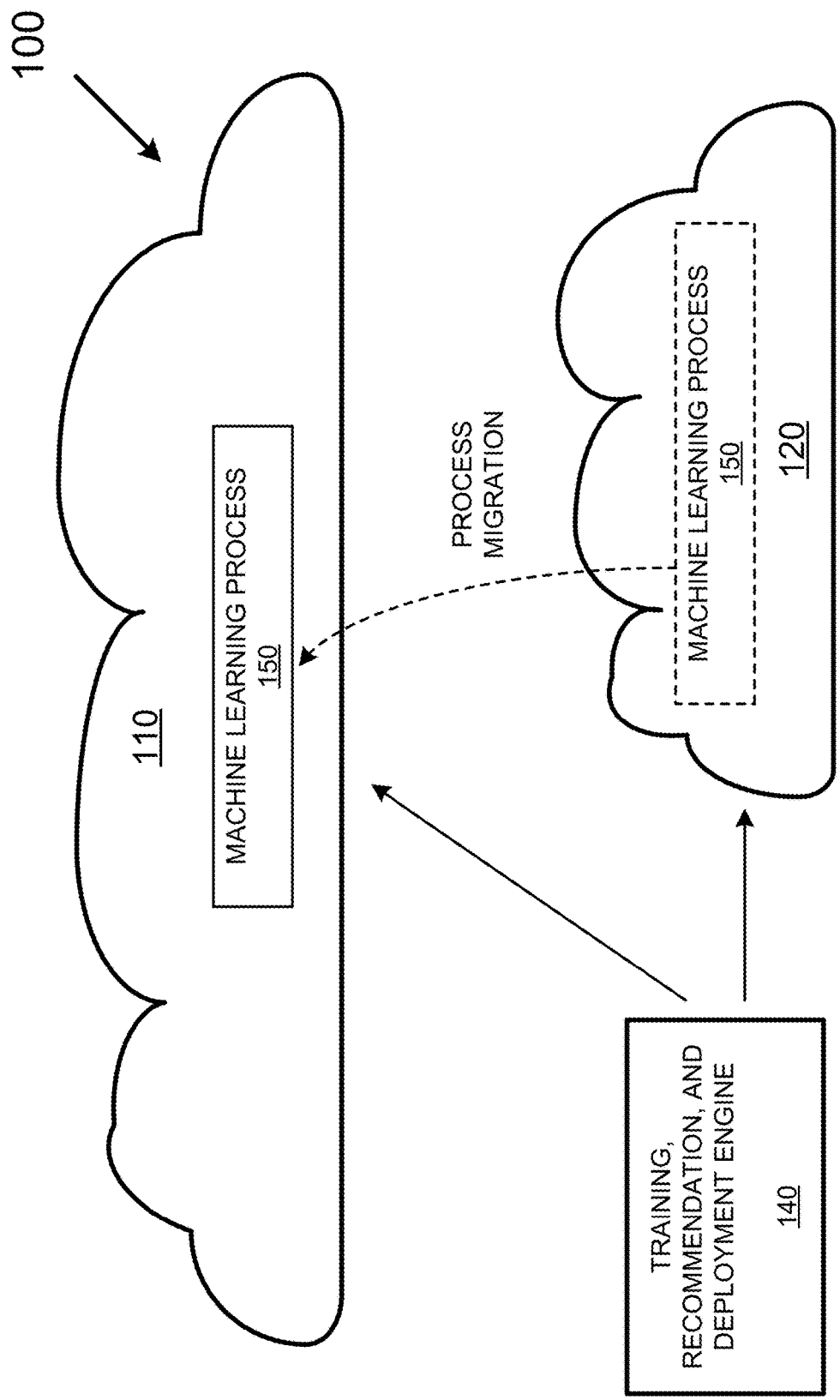
FIG. 1 depicts an example cloud bursting event.

The methods and systems disclosed below may be described generally, as well as described in terms of specific examples. For instances where references are made to detailed examples, it is noted that any of the underlying principles described are not to be limited to a single example but may be expanded for use with any of the other methods and systems described herein as will be understood by one of ordinary skill in the art unless otherwise specifically stated.

For the purposes of this disclosure, the following definitions apply.

The term "process" refers to a set of instructions usable on one or more machines, such as a computer, that performs a useful activity.

The term "activity" refers to any task/endeavor that may be found useful and/or desirable and that may be performed, in whole or in part, by a process. An activity may thus include, for example, email delivery, medical diagnoses, fraud detection, gaming, and so on.

While the term "machine learning" varies in industry, for the purposes of this disclosure "machine learning" refers to all varieties of artificial intelligence that may be accomplished using software, involve some form of training, and that can produce responses based on such training. Unless otherwise expressly stated, "machine learning" is to include any form of artificial intelligence or artificial neural network system (including both narrow and general deep learning).

The term "cloud computing" refers to running one or more processes on a shared pool of configurable computer system resources. These resources typically provide a number of high-level system resources (e.g., data and program storage space) and high-level services (e.g., the ability to run applications) often with minimal or no direct human management effort.

A "private cloud," also known as an internal or enterprise cloud, is a cloud computing resource that resides on an individual entity's (e.g., a company or government agency) intranet or data center where data is generally unavailable to the outside world and usually protected by a number of firewalls. Private clouds are often used by companies/entities that have already invested in their own infrastructure. Generally, examples of private clouds include a number of internal servers, some form of data and program storage device(s), and some form of an input/output server that facilitates communication between the internal servers, the data storage device(s), and a number of external Internet-based devices. The advantages of private clouds include a controlled yet flexible working environment that can maintain a desired level of security. For example, a private cloud administrator may install a number of sophisticated firewalls that deter unwanted intrusions not available on public resources. The drawback to a private cloud is that all management, maintenance, and updating of the operating software and hardware fall on the entity owning/controlling the private cloud.

A "public cloud" is a cloud computing and data storage resource operated by a third-party service provider typically available to the public over the Internet. All software, hardware and support infrastructure of a public cloud is the responsibility of the public cloud provider. One example of a public cloud is known as "Azure," which is owned and operated by Microsoft Corporation of Redmond, Wash. In a public cloud, a software developer will share the same hardware, storage, and network devices with any number of other entities or "cloud tenants." The advantages of public clouds include reduced costs. The disadvantages of public clouds include reduced security and a loss of flexibility for individual cloud tenants.

A "hybrid cloud" refers to a combination of the on-premises infrastructure of private clouds with the infrastructure of public clouds such that entities may enjoy the advantages of both cloud environments. In a hybrid cloud environment, applications and related data may be moved between private and public clouds. In operation according to various examples, an entity (e.g., a business or government agency) may relegate high-volume, lower-security processes (e.g., internet-based mail) to a public cloud while reserving sensitive business-critical operations, such as financial reporting, to the private clouds.

"Cloud bursting" is a form of hybrid cloud computing. The idea behind cloud bursting is to migrate/deploy a task from a private cloud to a public cloud. Cloud bursting is often employed when private cloud resources are inadequate to maintain a service or perform a service.

Unfortunately, there are a host of issues that make cloud bursting unavailable for certain types of processes. By way of example, cloud bursting of applications used to manage medical data or diagnose cancer may be unavailable because of a lack of HIPAA (Health Insurance Portability and Accountability Act) compliant public clouds. Other problems may include territorial and/or issues related to public cloud resources. For example, it may be undesirable for a particular United States (U.S.)-based entity to use or otherwise rely on cloud resources residing in China or controlled by a Russian entity. Similarly, it may be desirable to maintain financial and/or tax data using hardware located within the confines of a nation's borders such that the data may be controlled or regulated by a particular government entity. Other cloud-bursting applications may involve some form of block-chain security or buffered security whereby data privacy is less of an issue but where data integrity is.

Accordingly, the developers of the present methods and systems propose: (1) the establishment of public cloud resources that comply with the various desires and/or regulatory schemes of various bodies, such as government agencies and private associations, then (2) using such public cloud resources to perform computationally-intensive machine learning tasks that may excessively burden a private cloud environment. By way of example, it may be desirable to establish a HIPAA-compliant public cloud capable of performing deep learning operations in order to develop a better understanding of public health issues, better manage healthcare resources, and provide better diagnostic resources. Similarly, it may be desirable to establish a public cloud geographically located within the borders of a particular country, compliant with that country's tax and/or financial laws, and capable of performing deep learning based operations in order to better detect financial fraud.

Accordingly, private entities may be enabled to use the relatively modest resources of a private cloud to develop proprietary machine-learning processes and perform testing and training, then burst the machine-learning processes onto a specialized public cloud to offset the computational burdens such processes represent. Thus, improved machine learning based systems may be provided at a reduced costs.

Turning now to the drawings, FIG. 1 depicts an example cloud-bursting event tailored to the presently-disclosed methods and systems. As shown in FIG. 1, a training, recommendation, and deployment engine 150 can be used to coordinate the migration/deployment of a machine learning based process 150 from a private cloud 120 to a public cloud 110. In the present example of FIG. 1, the machine learning based process 150 maintains a particular service to a number of users using the private cloud 120 and is migrated/deployed to the public cloud 110 when spikes in resource demands occur. Additional details regarding training, recommendation, and deployment engines are provided below with respect to FIGS. 2-6.

Figure 2:
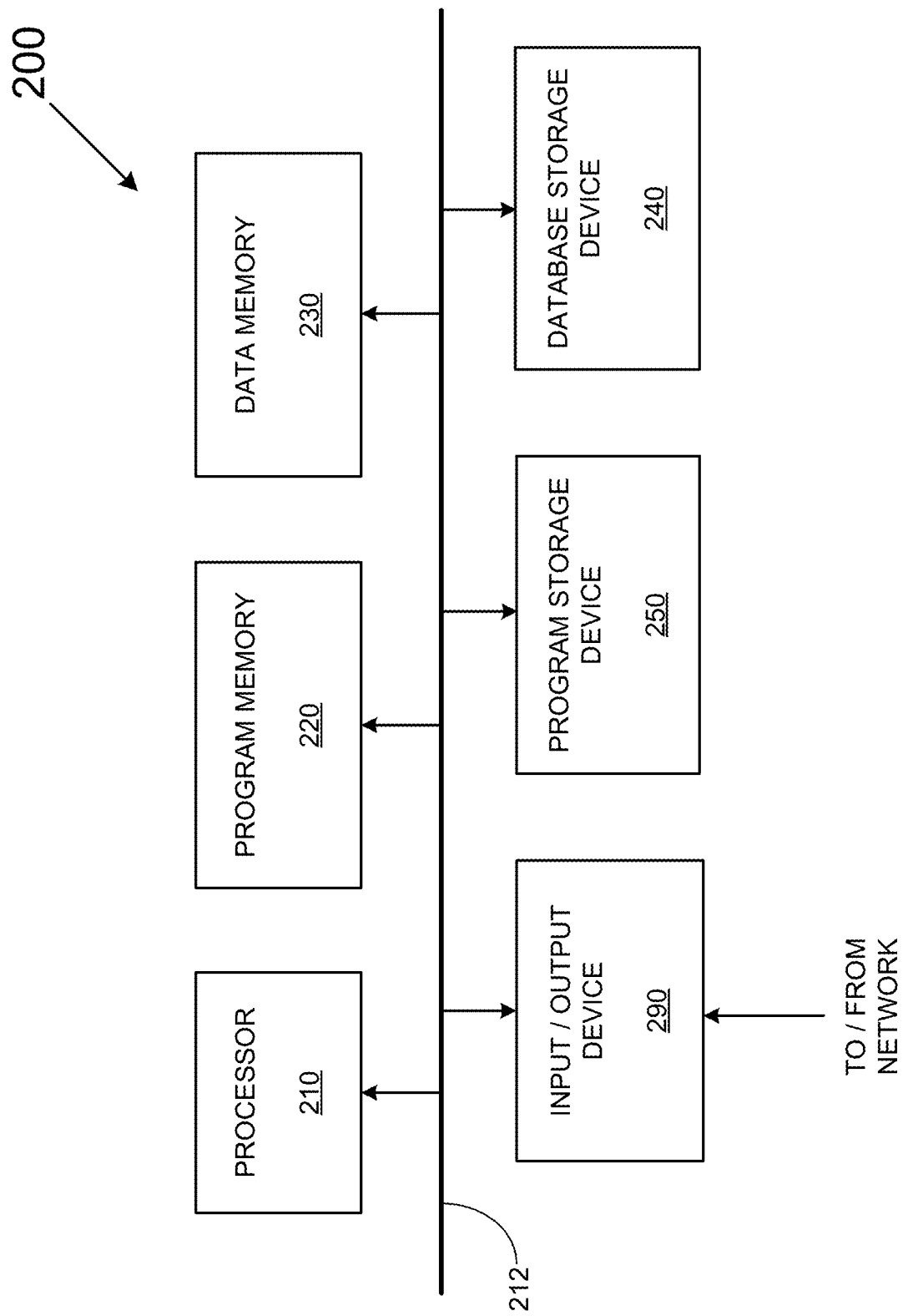
FIG. 2 is a block diagram of an example training, recommendation, and deployment engine.

FIG. 2 is a block diagram of an example training, recommendation, and deployment engine 200. As shown in FIG. 2, the example training, recommendation, and deployment engine 200 includes a processor 210 (e.g., a Central Processing Unit (CPU)), a program memory 220, a data memory 230, a database storage device 240, a program storage device 250, and an input/output device 290. The above components 210-290 are communicatively coupled together by a control/data bus 212.

Although the example training, recommendation, and deployment engine 200 of FIG. 2 uses a bussed architecture, it should be appreciated that any other architecture may be used as is well. For example, in various examples, the various components 210-290 can take the form of separate electronic components coupled together via a series of separate busses.

Still further, in other examples, one or more of the various components 210-290 can take form of separate servers coupled together via one or more networks. Additionally, it should be appreciated that each of components 210-290 advantageously can be realized using multiple computing devices employed in a cooperative fashion. For example, by employing two or more separate computing devices, e.g., servers, to provide separate processing and data-handling needs, processing bottlenecks can be reduced/eliminated and the overall computing time to produce histograms and other services can be significantly reduced.

It also should be appreciated that some processing, typically implemented in software/firmware routines residing in program memory 220, alternatively may be implemented using dedicated processing logic. Still further, some processing may be performed by software/firmware processes residing in separate memories in separate servers/computers being executed by different controllers.

In operation, the training, recommendation, and deployment engine 200 can first perform a number of setup operations including transferring an operating system and a number of appropriate program(s) from the program storage device 250 to the program memory 220. Thereafter, the processor 210 can perform any number of processes based on user commands entered via the input/output device 290, which provides an interface with external networks (e.g., private and public clouds) as well as with user peripherals, such as displays and keyboards.

Subsequent operations of the training, recommendation, and deployment engine 200 are discussed with respect to FIGS. 5-8.

Figure 3:
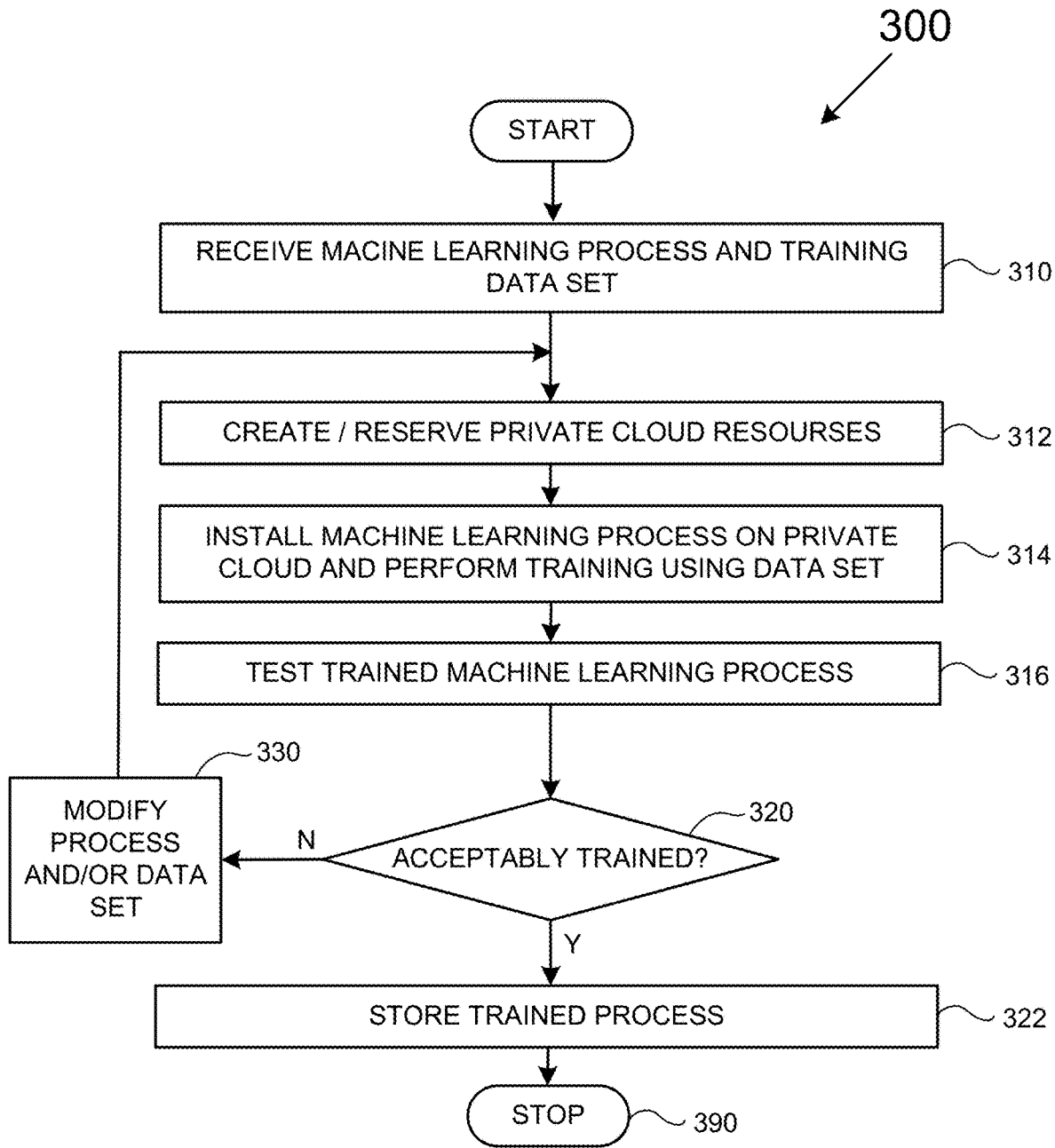
FIG. 3 is a flowchart of a method usable to train a machine learning based process.

FIG. 3 is a flowchart of a method 300 usable to train a machine learning based process that performs a specific activity. It is to be appreciated to those skilled in the art in light of this disclosure that, while the various operations of FIG. 3 are shown according to a particular order for ease of explanation, that certain operations may be performed in different orders or performed in a parallel fashion. The method 300 starts in operation 310 where a device, such as the training, recommendation, and deployment engine 200 of FIG. 2, receives a machine learning based process and training data set. Next, in operation 320, an appropriate amount of resources in a private cloud are created/reserved for training of the machine learning based process using the training data set. Then, in operation 314, the machine learning based process and training data set of operation 310 are installed in the private cloud, and training is performed on the machine learning based process using the training data set.

In operation 316, the machine learning based process is tested using a test data set. Next, in operation 320, a determination is made as to whether the machine learning based process is acceptably trained and performs the desired activity adequately. If the machine learning based process is acceptably trained, then the process continues to operation 322; otherwise, the method 300 jumps to operation 330.

In operation 330, the machine learning based process and/or training dataset of operation 310 is/are modified, and the operations of 312-320 are repeated until an acceptable machine learning based process is acceptably trained.

In operation 322, the acceptably trained machine learning based process is stored, and the method 300 stops at operation 390.

Figure 4:
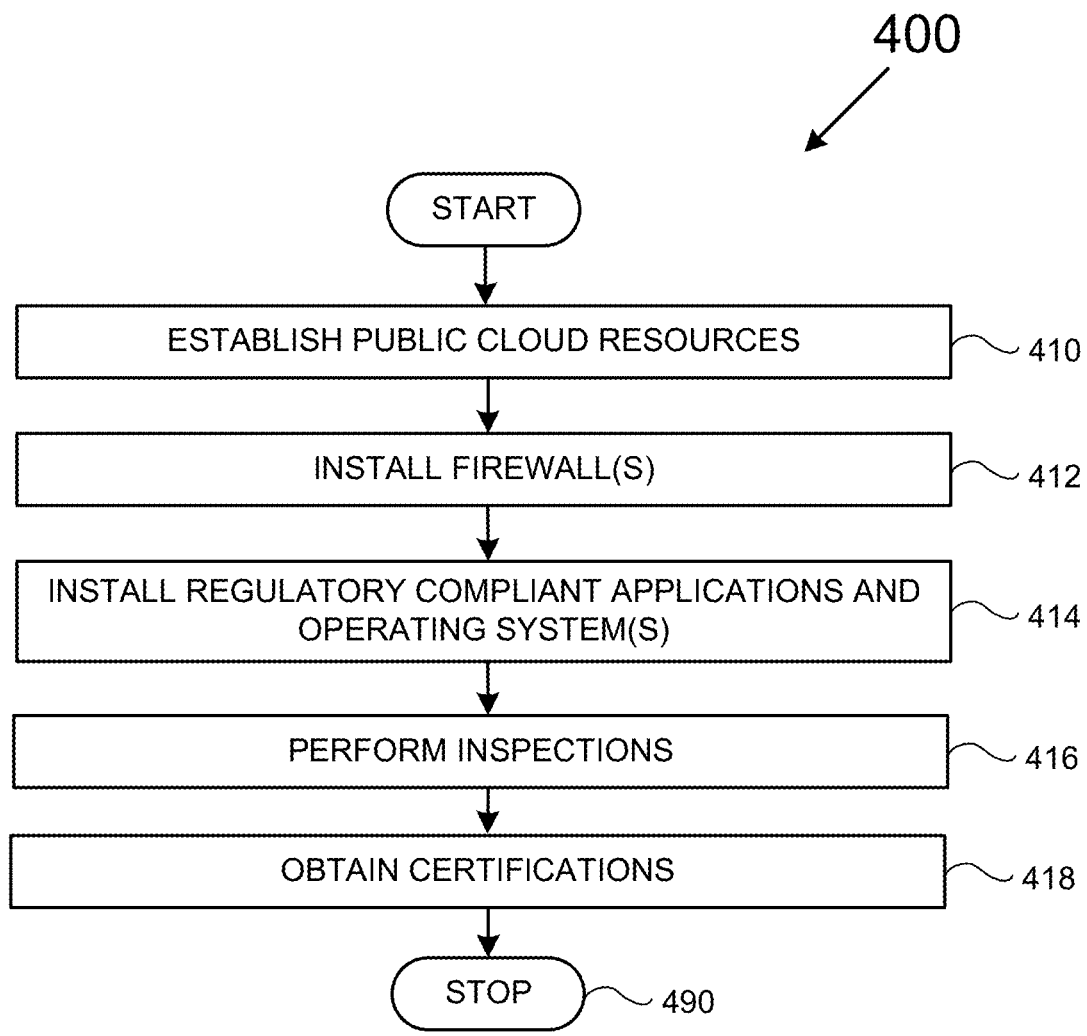
FIG. 4 is a flowchart of a method usable to create a regulatory compliant public cloud.

FIG. 4 is a flowchart of a method 400 usable to create a regulatory compliant public cloud. As with FIG. 3, it is to be appreciated to those skilled in the art in light of this disclosure that, while the various operations of FIG. 4 are shown according to a particular order for ease of explanation, that certain operations may be performed in different orders or performed in a parallel fashion. Still further, it may be appreciated that various operation may be omitted depending on the particular circumstances. The method 400 starts in operation 410 where the basic resources of a public cloud, such as the appropriate servers, data storage devices, and power systems, are established. Next, in operation 412, the appropriate security firewalls for external and internal communications are installed. Then, in operation 614, the appropriate regulatory compliant software applications and operating system(s) are installed.

In operation 416, the appropriate inspections are performed, and in operation 418 the appropriate regulatory certifications are obtained. The method 400 then stops at operation 490.

Figure 5:
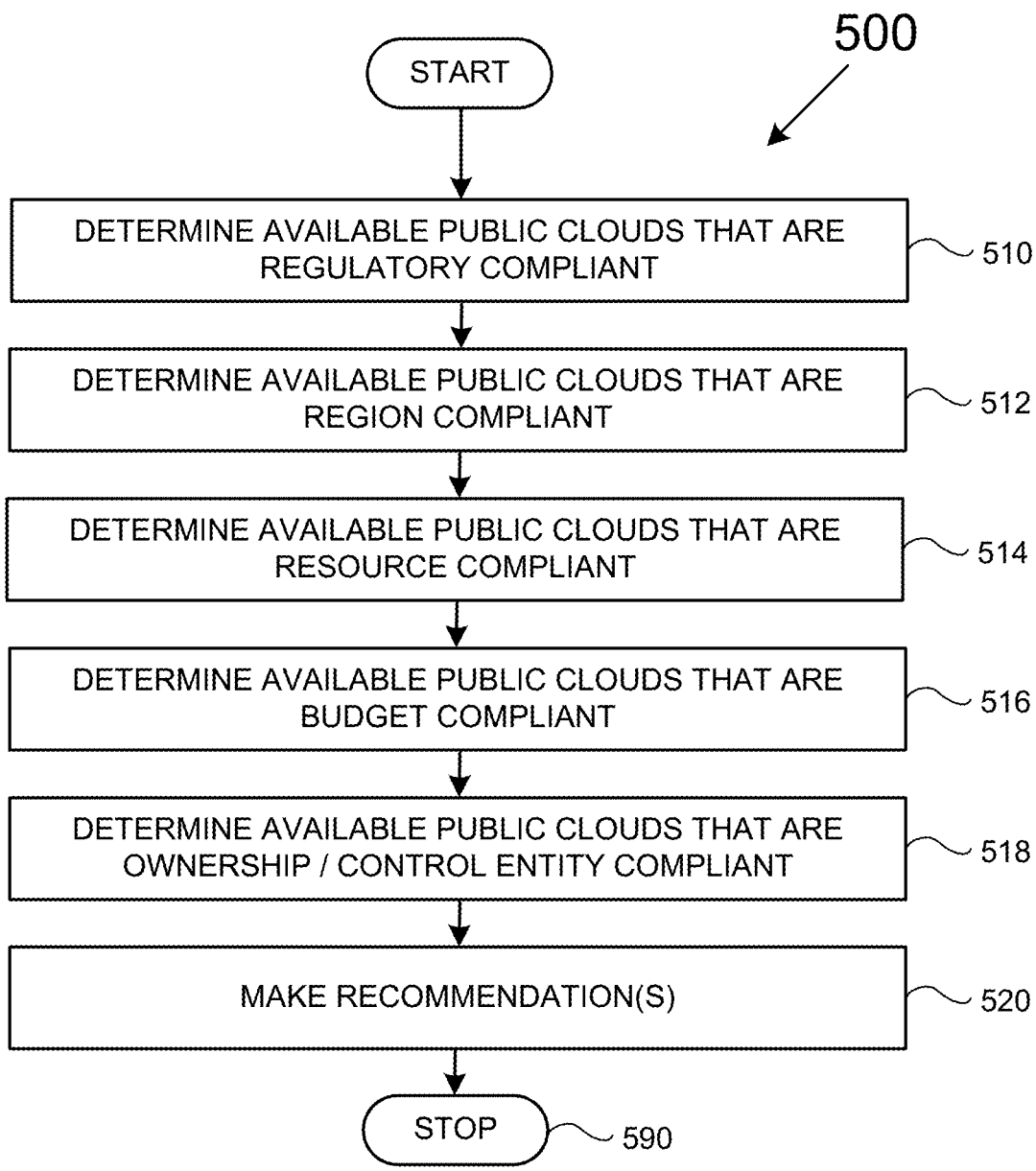
FIG. 5 is a flowchart of a method usable to make a recommendation for a machine learning capable public cloud.

FIG. 5 is a flowchart of a method 500 usable to make a recommendation for a machine learning compliant public cloud. As with FIGS. 3-4, it is to be appreciated to those skilled in the art in light of this disclosure that, while the various operations of FIG. 5 are shown according to a particular order for ease of explanation, that certain operations may be performed in different orders or performed in a parallel fashion. The method 500 starts in operation 510 where a device, such as the training, recommendation, and deployment engine 200 of FIG. 2, determines the availability of public clouds that are regulatory compliant for a given type of regulatory regimen. Such regulatory compliance may be, for example, a HIPAA compliance (i.e., a regulatory regimen that protects the privacy of medical information for individual patients), a non-U.S. equivalent to HIPAA, or any other number of regulatory regimens in any field of endeavor that is regulated by a government entity or private association.

In operation 512, a determination is made regarding the availability of public clouds that are region compliant. Such region compliance may include, for example, a national boundary, a state boundary, a provincial boundary, a county (or equivalent) boundary or a city boundary.

In operation 514, a determination is made regarding the availability of public clouds that are resource compliant. Such resource compliance may relate to any combination of hardware and software. For instance, in a first example resource compliance may include total memory and processing power, while in another example resource compliance may be more concerned with input/output speed.

In operation 516, a determination is made regarding the availability of public clouds that are compliant to a user's budget. Budget compliance may be based on any type of financial criteria, such as total monthly costs to an entity, whether the public cloud may be available at a fixed fee, whether or not the public cloud charges according to total usage, whether or not the public cloud charges an unacceptable premium for large usage spikes, and so on.

In operation 518, a determination is made regarding the availability of public clouds that are ownership compliant and/or entity controlled compliant. By way of example, it may be desirable to limit a selection of public health related activities to public clouds that are owned and controlled by a U.S. company or a U.S. government entity.

In operation 520, one or more recommendations for public clouds are made based on the operations of 510-518, and the method 500 stops at operation 590.

Figure 6:
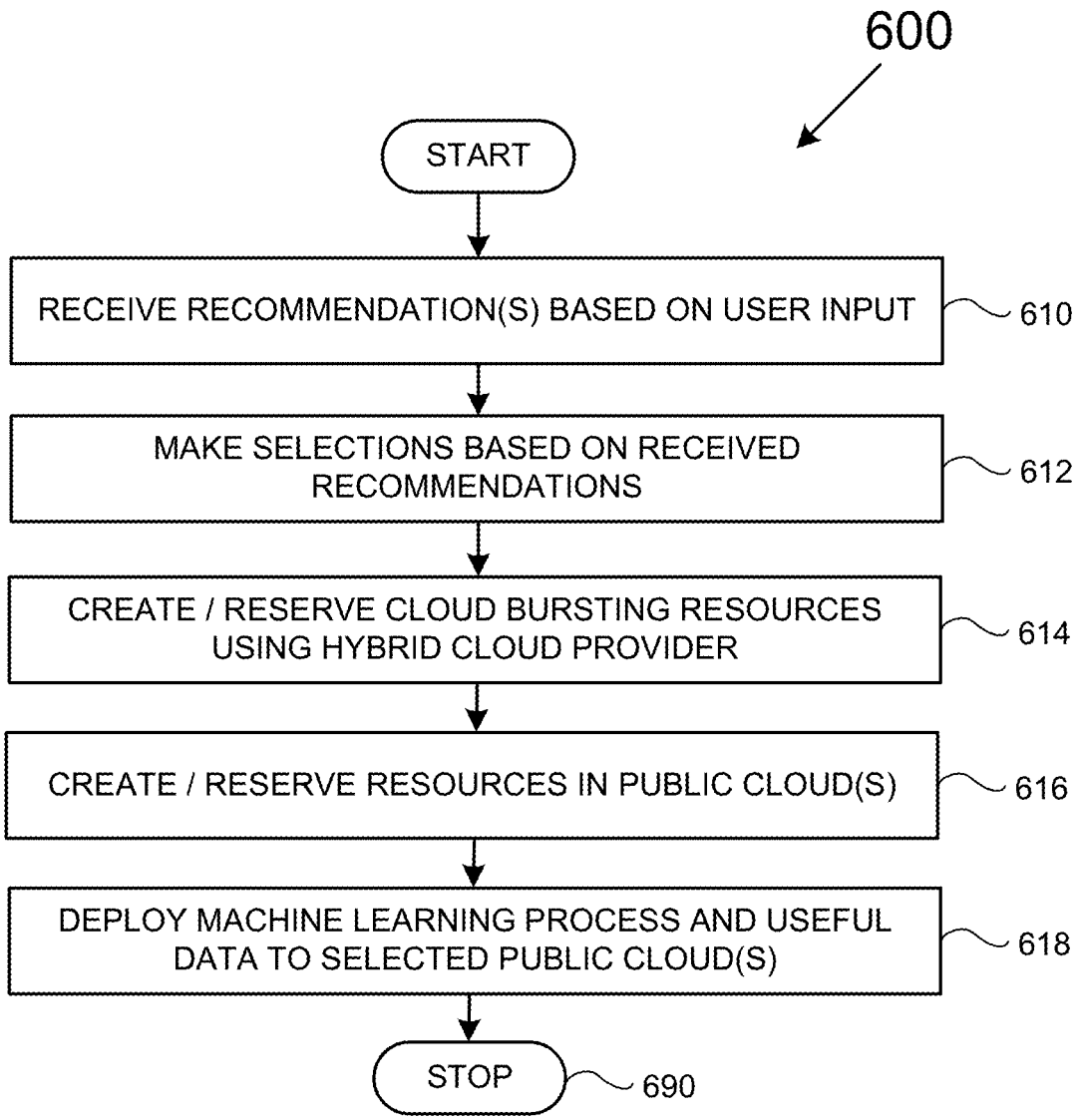
FIG. 6 is a flowchart of a method usable to deploy a machine learning based process to a recommended machine learning capable public cloud.

FIG. 6 is a flowchart of a method 600 usable to deploy a machine learning based process to a recommended machine learning public cloud. As with the above flowcharts, it is to be appreciated to those skilled in the art in light of this disclosure that, while the various operations of FIG. 6 are shown according to a particular order for ease of explanation, that certain operations may be performed in different orders or performed in a parallel fashion. The method 600 starts in operation 610 where public cloud recommendations based on a set of user-defined criteria are received. Such recommendations can be made, for example, based on the method 500 of FIG. 5, and may include a set of one or more public clouds that comply with the set of user-defined criteria.

As discussed above, the criteria for such selections may vary widely and include, for example, regulatory compliance, region compliance, resource compliance, budget compliance, ownership compliance, and control entity compliance. Each type of compliance may be based upon a specific set of criteria. By way of example, regulatory compliance may be partial or complete, and may be based upon a set of regulatory criteria used to regulate a particular activity, such as diagnosing cancer.

In operation 612, a selection of one or more public clouds is made based on the received recommendations of operation 610.

In operation 614, the appropriate hybrid cloud resources are created/reserved to allow for a machine learning based process to be migrated/deployed from a private cloud to a public cloud (i.e., allow for a cloud bursting operation). Next, in operation 616, the appropriate public cloud resources are created/reserved to allow for the machine learning based process to be migrated/deployed from the private cloud to the public cloud.

In operation 618, one or more machine learning based processes (with appropriate data) are migrated/deployed from the private cloud to the public cloud in a cloud bursting event, and the method 600 stops at operation 890.

In various examples where the above-described systems and/or methods are implemented using a programmable device, such as a computer-based system or programmable logic, it should be appreciated that the above-described systems and methods can be implemented using any of various known or later developed programming or scripting languages, such as "SQL," "C," "C++," "FORTRAN," "Pascal," "Python," "VHDL" and the like.

Accordingly, various storage media, such as magnetic computer disks, optical disks, electronic memories or any other form of non-transient computer-readable storage memory, can be prepared that can contain information and instructions that can direct a device, such as a computer, to implement the above-described systems and/or methods. Such storage devices can be referred to as "computer program products" for practical purposes. Once an appropriate device has access to the information and programs contained on the storage media/computer program product, the storage media can provide the information and programs to the device, thus enabling the device to perform the above-described systems and/or methods. Unless otherwise expressly stated, "storage medium" is not an electromagnetic wave per se.

For example, if a computer disk containing appropriate materials, such as a source file, an object file, an executable file or the like, were provided to a computer, the computer could receive the information, appropriately configure itself and perform the functions of the various systems and methods outlined in the diagrams and flowcharts above to implement the various functions. That is, the computer could receive various portions of information from the disk relating to different elements of the above-described systems and/or methods, implement the individual systems and/or methods and coordinate the functions of the individual systems and/or methods related to database-related services.

While the methods and systems above are described in conjunction with specific examples, it is evident that many alternatives, modifications, and variations will be apparent to those skilled in the art. Accordingly, the examples above as set forth herein are intended to be illustrative, not limiting. There are changes that may be made without departing from the scope of the present disclosure.

What is claimed is:

1. A method comprising:
    developing and training, using a private cloud, a machine learning based process to perform an activity;
    providing the trained machine learning based process as a service using the private cloud to a number of users of the private cloud;
    identifying a recommended set of a plurality of candidate public clouds, wherein each of the plurality of candidate public clouds complies with a set of regulatory criteria used to regulate the activity and wherein the set of regulatory criteria represent regulations enacted by a government entity or a private association;
    receiving a selection of a candidate public cloud of the recommended set; and
    during a spike in demand on resources of the private cloud, performing a cloud bursting operation to deploy the trained machine learning based process to the selected candidate public cloud.

2. The method of claim 1, wherein
    the activity is a healthcare-related activity; and
    the set of regulatory criteria include privacy regulations for individual patients.

3. The method of claim 1, wherein the activity is fraud detection for a desired geographic region.

4. The method of claim 1, further comprising:
    identifying one or more candidate public clouds of the recommended set that reside within a desired geographic region, wherein
    said receiving a selection includes limiting the selection to those candidate public clouds of the recommended set that reside within the desired geographic region.

5. The method of claim 1, further comprising:
    identifying one or more candidate public clouds of the recommended set that meet a minimum desired set of performance criteria, wherein
    said receiving a selection includes limiting selection to those candidate public clouds of the recommended set that meet the minimum desired set of performance criteria.

6. The method of claim 1, further comprising:
    identifying one or more candidate public clouds of the recommended set that meet a desired budget constraint, wherein
    said receiving a selection includes limiting the selection to those candidate public clouds that meet the desired budget constraint.

7. The method of claim 1, further comprising:
    identifying one or more candidate public clouds of the recommended set that is controlled by a desired entity, wherein
    said receiving a selection includes limiting the selection to those candidate public clouds that are controlled by the desired entity.

8. The method of claim 1, further comprising:
    identifying one or more candidate public clouds of the recommended set that reside within a desired geographic region;
    identifying one or more candidate public clouds of the recommended set that meet a minimum desired set of performance criteria; and
    identifying one or more candidate public clouds of the recommended set that meet a desired budget constraint, wherein
    said receiving a selection includes limiting the selection to those public clouds that reside within the desired geographic region, meet the minimum desired set of performance criteria, and meet the desired budget constraint.

9. The method of claim 8, further comprising:
    identifying one or more candidate public clouds of the recommended set that is controlled by a desired entity, wherein
    said receiving a selection includes limiting the selection to those public clouds that are controlled by the desired entity.

10. The method of claim 8, wherein
    the activity is a healthcare-related activity; and
    the set of regulatory criteria include privacy regulations for individual patients.

11. The method of claim 8, wherein the activity is fraud detection for the desired geographic region.

12. The method of claim 8, further comprising deploying the selected candidate public cloud such that the selected candidate public cloud complies with the set of regulatory criteria used to regulate the activity.

13. The method of claim 1, further comprising designing and deploying the selected candidate public cloud such that the selected candidate public cloud complies with the set of regulatory criteria used to regulate the activity.

14. A non-transitory computer-readable medium comprising computer executable instructions stored thereon that when executed by a processor, cause the processor to:
    identify a recommended set of a plurality of candidate public clouds, wherein each of the plurality of candidate public clouds complies with a set of regulatory criteria used to regulate an activity performed by a machine learning based process provided as a service using a private cloud to a number of users of the private cloud in which the machine learning based process was developed and trained and wherein the set of regulatory criteria represent regulations enacted by a government entity or a private association;
    receive a selection of a candidate public cloud of the recommended set; and
    during a spike in demand on resources of the private cloud, perform a cloud bursting operation to deploy the machine learning based process to the selected candidate public cloud.

15. The computer program product of claim 14, wherein:
    selection of the candidate public cloud of the recommended set further takes into consideration at least one of a desired geographic region, a minimum desired set of performance criteria, and a desired budget constraint.

16. The computer program product of claim 15, wherein:
    selection of the candidate public cloud of the recommended set further takes into consideration all of a desired geographic region, a minimum desired set of performance criteria, and a desired budget constraint.

17. A device comprising:
    a processor and memory communicatively coupled to the processor, the memory containing instructions that cause the processor to:
        develop and train, using a private cloud, a machine learning based process to perform an activity;

provide the trained machine learning based process as a service using the private cloud to a number of users of the private cloud;

identify a recommended set of a plurality of candidate public clouds, wherein each of the plurality of candidate public clouds complies with a set of regulatory criteria used to regulate the activity and wherein the set of regulatory criteria represent regulations enacted by a government entity or a private association;

receive a selection of a candidate public cloud of the recommended set; and during a spike in demand on resources of the private cloud, perform a cloud bursting operation to deploy the trained machine learning based process to the selected candidate public cloud.

* * * * *